May 4, 1948. S. C. CARWILE 2,441,058
ANIMAL BED AND SCRATCHER
Filed March 19, 1945
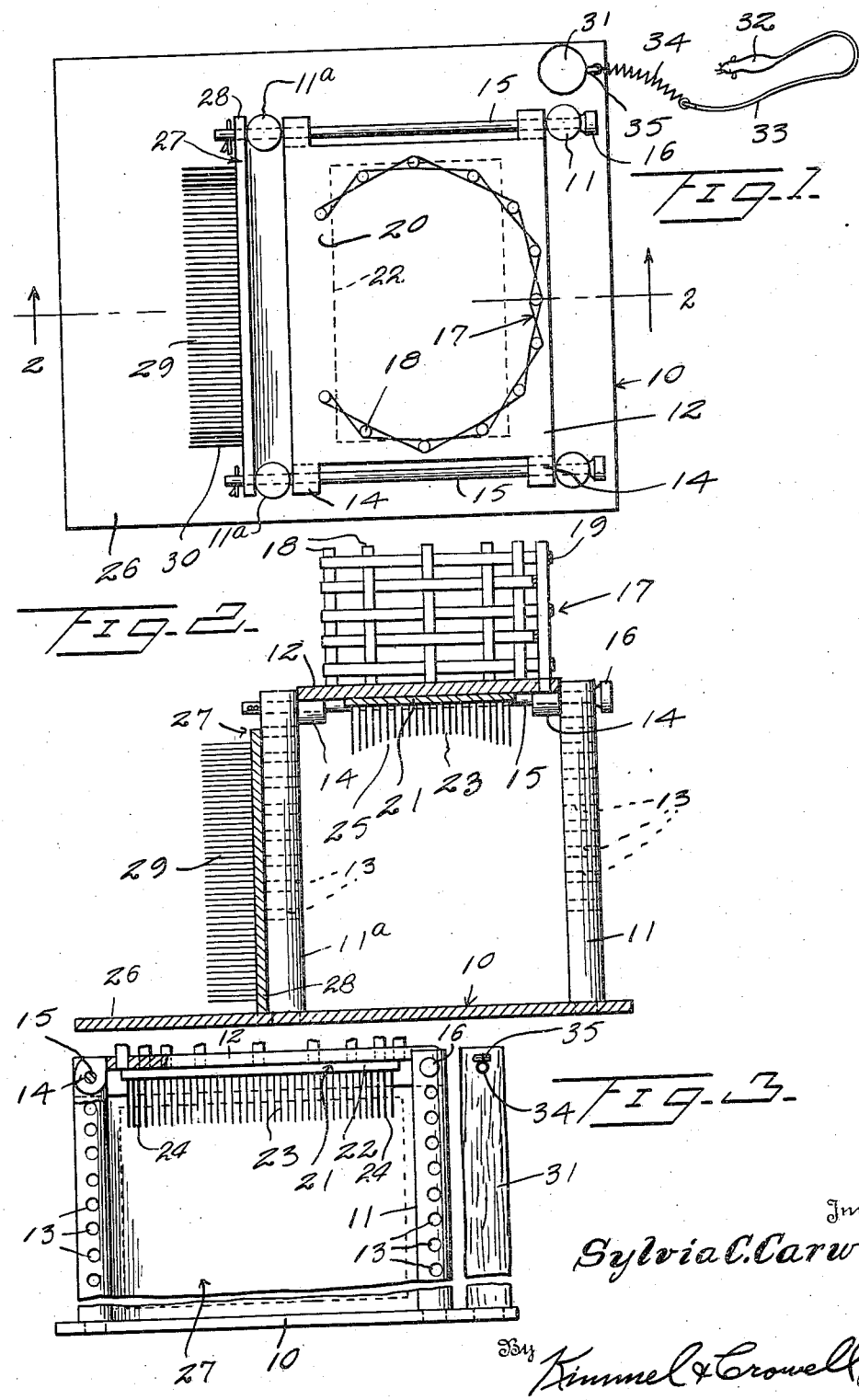
Inventor
Sylvia C. Carwile
By Kimmel & Crowell
Attorneys Patented May 4, 1948

2,441,058

UNITED STATES PATENT OFFICE 2,441,058

ANIMAL BED AND SCRATCHER

Sylvia C. Carwile, Roanoke, Va.

Application March 19, 1945, Serial No. 583,453

2 Claims. (Cl. 119—83)

This invention relates to an animal bed and scratcher.

An object of this invention is to provide a device which can be used by an animal for scratching its back or other parts of its body, the device also including a bed on which the animal may rest.

Another object of this invention is to provide a device of this kind which includes a base, and a plurality of brush members supported above the base in a position whereby the animal may conveniently contact with the bristles of the brush members, the bristles being of different resiliency so that the animal may obtain the desired scratching or rubbing of the desired parts of its body.

A further object of this invention is to provide a device of this kind which is simple in construction and can be readily cleaned so that the device can be kept sanitary.

To the foregoing objects and others which may hereinafter more fully apear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail top plan of an animal scratching device, constructed according to an embodiment of this invention.

Figure 2 is a sectional view taken on the line 2—2 of Figure 1.

Figure 3 is a detail rear elevation, partly broken away and in section, of the device.

Referring to the drawing, the numeral 10 designates generally a base which may be constructed as a plate of rectangular configuration and of suitable size and thickness. The base 10 has mounted thereon a plurality of upstanding posts or supports 11, there being four of these posts or supports, and these supports are provided with vertically spaced openings 13.

A bottom wall 12 for a bed or basket comprises a plate and is supported from the posts 11 at a point spaced upwardly from the base 10. The plate 12 is provided at the opposite ends thereof with ears 14 extending outwardly from the adjacent ends of the bottom wall 12, and a holding pin 15 is extended through selected aligned openings of the posts 11 and a pair of the ears 14. The pin 15 is provided at one end with a head 16 by means of which the pin may be readily withdrawn or inserted in its supporting position.

The bottom wall 12 has formed on the upper side thereof a basket generally designated as 17. This basket 17 comprises a plurality of uprights 18 and a plurality of narrow strips or bands 19, which are woven about the uprights 18 in a manner to provide a perforate upper wall. The uprights 18 are disposed in partially elliptical form, as shown in Figure 1, and the strips 19 are woven in a manner to provide an entrance 20, by means of which the animal may readily enter the interior of the basket, which forms a bed for the animal.

In order to provide a means whereby the animal may scratch or rub its head and back, I have provided a back engaging brush, generally designated as 21. The brush 21 includes a back 22, which is secured to the lower side of the bottom wall 12, and the back 22 has secured thereto a plurality of bristles 23. The bristles 23 are preferably formed of steel, or other relatively rigid material, so that when the animal engages the bristles 23, the latter will provide the necessary scratching or rubbing action on the back or head of the animal.

In order to provide a softer rubbing action on the back or head of the animal, I have provided fibre bristles 24, which are disposed adjacent the opposite ends of the back 22 outside of the steel bristles 23. These fibre bristles are of substantially the same length as the steel bristles 23, and provide a softer rubbing action, in addition to preventing the animal from injuring itself in the initial contact with the end bristles.

As shown in Figure 2, the bristles 23 and 24 are arranged on an arc, as indicated by the numeral 25. This arc is transverse to the length of the brush and provides a means whereby a large area of the back or head of the animal may be contacted by the brush. The bottom wall 12 of the basket is supported above the base 10 a sufficient height so that the animal may readily walk between the posts 11 and the brush and at the same time contact with the bristles of the brush.

The posts or supporting members 11 are mounted on the base 10 in a manner to provide a platform 26 at one side of the base, and a second brush, generally designated as 27, is mounted in a vertical position and secured in any suitable manner to the adjacent pair of posts 11ª. The brush 27 includes a back 28, which may be secured to the adjacent posts 11ª and the brush 27 is formed with inner steel bristles 29 and outer fibre bristles 30.

The brush 27 is preferably flat and the provision of the fibre bristles 30 at the ends of the brush 27 provides a means whereby the animal will not injure itself when rubbing its head against this brush. The brush 27 provides a means whereby the animal may scratch its sides. A scratching post 31 is secured to the base 10 adjacent one corner thereof, and the post 31 is provided with a relatively rough outer surface similar to the surface of the bark of a tree, and the scratching post 31 has connected thereto an article 32, which may be impregnated with mint or other suitable composition. The article 32 may be shaped in the form of a mouse, and the article 32 is connected to the post 31 by means of a cord 33. Preferably a spring 34 is connected at one end to the inner end of the cord 33 and the opposite end of the spring 34 is connected to an eye 35, which is carried by the post 31.

The posts 11 may be mounted on the base in a manner whereby the entire structure may be initially knocked down so that the device may be shipped in compact form and assembled by the purchaser.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What is claimed is:

1. A device as described comprising a base, a plurality of uprights carried by said base, a brush supporting member comprising a plate, apertured ears extending from opposite edges thereof, supporting rods engaging said uprights and said ears for supporting said plate in adjusted spaced relation above said base, and a brush secured to the lower side of said plate.

2. A device as set forth in claim 1, wherein said brush is formed with inner metal bristles, and outer fiber bristles adjacent each end thereof.

SYLVIA C. CARWILE.

REFERENCES CITED

The following references are of record in the file of this patent:

UNITED STATES PATENTS

| Number | Name | Date |
| --- | --- | --- |
| 1,582,144 | Pflaum | Apr. 27, 1926 |
| 1,627,516 | Larson | May 3, 1927 |
| 1,704,724 | Chudomelka | Mar. 12, 1929 |

FOREIGN PATENTS

| Number | Country | Date |
| --- | --- | --- |
| 461,582 | Germany | June 23, 1928 |